United States Patent [19]

Nicholas

[11] Patent Number: 5,221,379

[45] Date of Patent: Jun. 22, 1993

[54] RETRACTABLE TIRE STUD

[76] Inventor: James G. Nicholas, 647 N. San Pedro #1, San Jose, Calif. 95110

[21] Appl. No.: 642,912

[22] Filed: Jan. 18, 1991

[51] Int. Cl.$^5$ .................. B60C 11/16; A43C 15/14
[52] U.S. Cl. .................. 152/212; 152/210; 156/114; 36/61
[58] Field of Search .............. 152/167, 168, 169, 208, 152/210, 211, 212; 156/114; 36/59 R, 59 A, 61, 62

[56] References Cited

U.S. PATENT DOCUMENTS

| | | | |
|---|---|---|---|
| 1,307,208 | 6/1919 | Muntz | 152/210 |
| 1,361,078 | 12/1920 | Lynn | 36/61 |
| 3,889,735 | 6/1975 | Salakari | 152/169 |
| 4,619,301 | 10/1986 | Hiroki | 152/210 |
| 4,838,329 | 6/1989 | Ohuchi | 152/210 |
| 4,844,137 | 7/1989 | Finarsson | 152/210 |
| 4,883,104 | 11/1989 | Minami | 152/210 |

FOREIGN PATENT DOCUMENTS

| | | | |
|---|---|---|---|
| 2103114 | 7/1972 | Fed. Rep. of Germany | 152/210 |
| 58-112809 | 7/1983 | Japan | 152/210 |

Primary Examiner—Michael W. Ball
Assistant Examiner—Francis J. Lorin

[57] ABSTRACT

A stud for a tire to improve traction on a roadway which includes a hardened pin mounted in a steel jacket and extending therefrom to engage the roadway, wherein the stud is sized for insertion into openings in the tire tread. The pin is retractable into the jacket thereby removing the pin from contact with the road surface and providing non-studded as well as studded service from the same tire. A spring in the stud jacket is used to propel the pin out of the jacket into the extended position when the pin is released from the securing mechanism. The securing mechanism consists of a series of projections on the pin in interaction with a series of grooves in the interior of the stud jacket. The pin is released from the retracted position by manually pressing the pin further into the jacket until the securing mechanism releases it. The spring also acts to ensure that the pin protrudes the proper distance, when in contact with the roadway, from the surface of the tire by providing less force than necessary to keep the pin extended when the pin is extended more than the proper distance and more force than necessary when the pin is extended less than the proper distance. This self adjusting feature of the spring may be necessary to keep the optimum pin extension due to the differences in the wear rate of the pin and the tire tread due to the pin being retracted for prolonged periods of time. The pin is retracted into the jacket manually by pressing the pin back into the jacket until the securing mechanism locks into place.

3 Claims, 5 Drawing Sheets

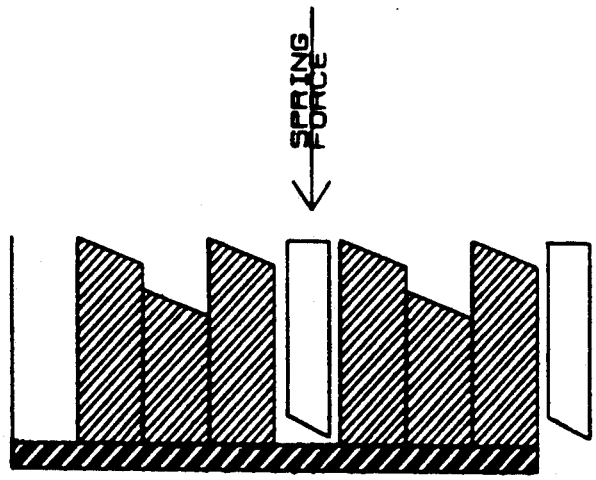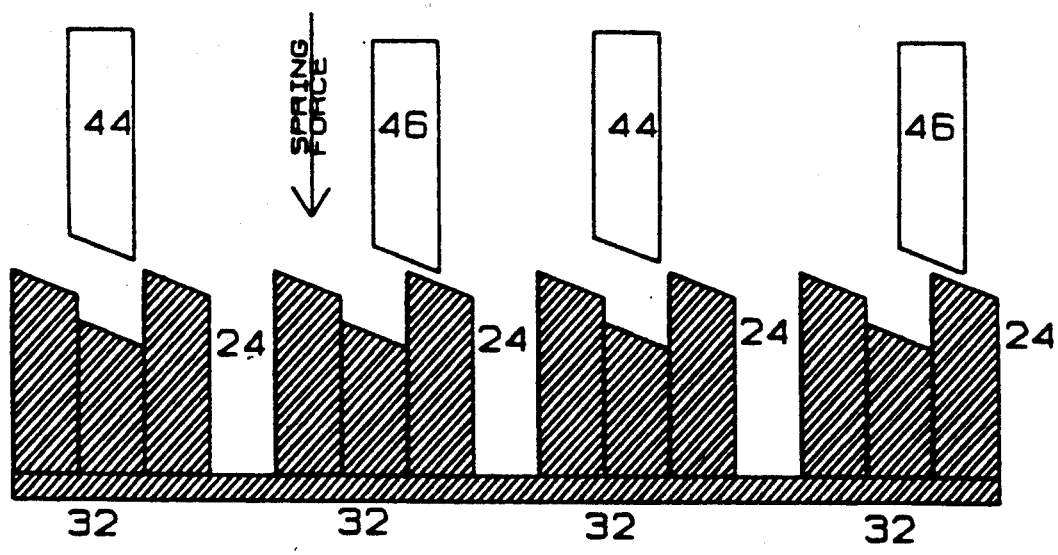

RETRACTABLE TIRE STUD

BACKGROUND OF THE INVENTION

1. Field of the Invention

Heretofore, it has been well known to provide studs for tires and particularly studs that are insertable into preformed openings of a tire tread. Such studs have been used to improve the traction of the tier tread with slippery roadway surfaces. The tread of such tires has embedded therein numerous such studs which project from the tire surface by 1.5 to 2.0 mm. The studs are ordinarily provided with hard metal tips to protect them from wearing down. When a vehicle fitted with such studded tires travels over a road surface that is not covered with ice or snow, the road surface is gouged by the hard metal tips of the studs, and the gouged out material enters the surrounding air in the form of dust. Many states allow studded tire use on roadways during the winter months and prohibit their use during the non-winter months to reduce the road damage and dust problems. This regulation of studded tire use, studded tires allowed half the year and prohibited the other half, causes those members of the public desiring the added traction of studded tires in the winter months to keep two sets of tires, one set studded for the winter and one set non-studded for mon-winter. The purchase of two sets of tires is expensive and causes storage problems.

2. Description of the Prior Art

There have recently been proposed devices which project and retract studs depending on the road surface condition. See U.S. Pat. No. 4,883,104. The studs of these devices are, however, extremely complex in structure, and since they require a source of power (for example, a pneumatic or electrical actuator) for projecting and retracting the studs, they tend to be large in size and high in cost. This has prevented their practical application. Further, some non-skid devices that do not utilize studs have been proposed that show promise in providing protection against slippery roadways without gouging the roadway and raising dust. See U.S. Pat. No. 4,838,329. However, whether these new non-skid devices will provide the needed protection against slippage as well as be commercially viable remains to be seen.

Therefore, there is a need for a tire stud system that is low in cost and reliable in operation, that is capable of preventing slippage on wet or icy roadways and that can be retracted allowing non-studded tire travel on the same tire used during the winter months.

SUMMARY OF THE INVENTION

This invention relates in general to a stud for a vehicle tire to improve traction of the tire on wet and slippery road surfaces, and more particularly to a stud that is readily insertable into a preformed opening in the tread of a tire, and still more particularly to a stud with a pin that is retractable into the stud jacket so as to provide for non-studded and studded service from the same tire.

BRIEF DESCRIPTION OF THE DRAWINGS

FIG. 14 is a continuation of FIG. 13. (As in FIG. 12, the pin has continued to rotate to the right, the pressure of the spring pushing the projection down the slanted top of the jacket groove and thereby continuing the rotation to the right of the stud pin. The pin projections continue to move in the downward right direction until settling in the deep notch of the jacket grooves as shown. This corresponds to the pin extended position. FIG. 10 through FIG. 14 have shown how the interaction of the pin projections, the jacket grooves, the outward force of the spring, and an inward manual force pressing down on the pin cause the pin to lock in the retracted position, then hold in the extended position, then lock in the retracted position, etc.)

FIG. 15 is a flattened layout of the entire (full 360 degrees) stud jacket groove, stud pin projection design. (The purpose of this illustration is to demonstrate how the rightward rotation of the pin is effected by the inward manual force applied to the pin. The jacket grooves and pin projections all are oriented with a rightward slant. The two pin projections represented as item 46 have a slightly greater rightward slant than the two projections represented as item 44.

Figure 1:
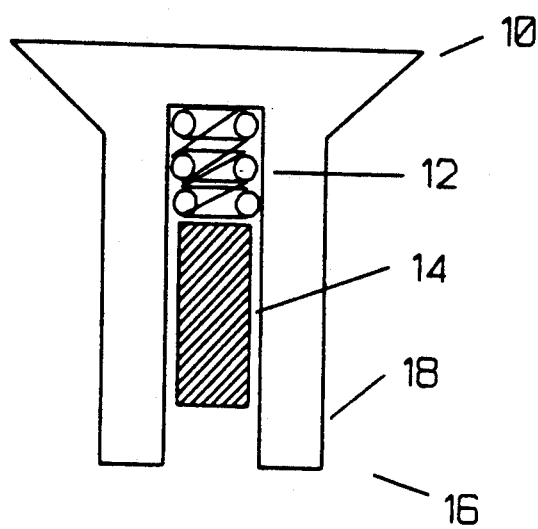
FIG. 1 is a side view of the stud in the retracted position with the pin below the exterior surface of the tire.

In the situation represented in FIG. 15 the stud was most recently in the pin retracted position and the pin is currently being depressed by an external force. As the pin is depressed the rightward slant of the jacket grooves and pin projections interaction causes the pin to rotate to the right. The pin projections represented by item 46 will clear their respective jacket groove groups slightly before the pin projections represented by item 44 do. When the pin projections of item 44 clear their respective jacket groove groups, pin projections, item 46, will have rotated far enough to the right to catch the edge of the rightward slanting groove tops of the groove groups to the immediate right, causing the pin to continue to rotate to the right and the four pin projections to fall into the deep slots (item 24), which corresponds to the extended pin position.)

Item Descriptions

10. Base of stud jacket
12. Spring
14. Carbide pin
16. Tire surface
18. Stud jacket
20. Sectional view of stud jacket interior
22. Stud jacket groove
24. Stud pin retracted position slot
26. Stud jacket groove
28. Stud pin extended position slot
30. Stud jacket groove wall
32. Groove group; composed of items 22, 24, 26, and 28. There are four groove groups per stud.
40. Bottom of stud pin
42. Carbide bit
44. Perspective view of stud pin projection
46. Slightly exaggerated rightward slanting pin projection

DESCRIPTION OF THE PREFERRED EMBODIMENTS

Referring to the accompanying drawings and first to FIGS. 1, 2, 3, and 4 there is shown a tire stud according to the present invention employing a locking mechanism consisting of a series of projections and grooves located on the stud pin and inner stud jacket respectively.

Referring now to the drawings, the stud comprises a central pin, item 14, encased in a jacket, item 18, said jacket being flanged at the base, item 10, and having an opening for the pin to protrude from the stud jacket at the other end. The stud is embedded under the surface of the tire, item 16.

Figure 12:
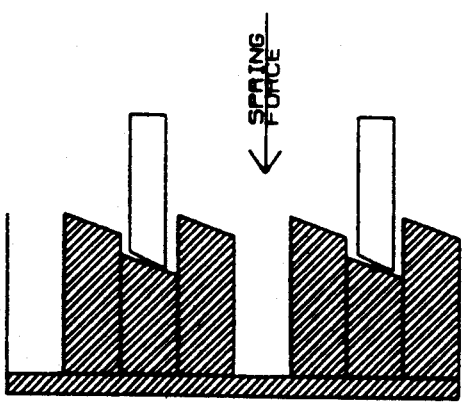
FIG. 12 is a continuation of FIG. 11. (The pin has continued to rotate to the right, the pressure of the spring pushing the projection down the slanted top of the jacket grooves and thereby continuing the rotation to the right of the stud pin. The pin projections continue to move in the downward right direction until settling in the shallow notch of the jacket grooves as shown. This corresponds to the retracted pin position.)

FIG. 1 shows the pin, item 14, in the retracted position with the pin below the surface of the tire, item 16. The compressed spring, item 12, applies a force to propel the pin out of the jacket opening. The pin is nevertheless locked into the retracted position by the interaction of a series of projections on the pin, item 44, with a series of grooves on the jacket interior, item 32, as represented in FIG. 12.

In the locked pin retracted position the pin projections, item 44, are resting in the shallow notches, item 28, of the jacket grooves, item 32. When the pin projections are resting in the shallow groove slots this causes the pin to be retracted because the pin projections and therefore the pin itself is further from the jacket opening and the tire surface.

Figure 2:
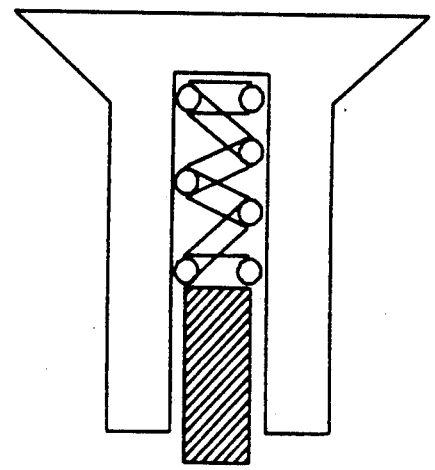
FIG. 2 is a side view of the stud in the extended position.
Figure 3:
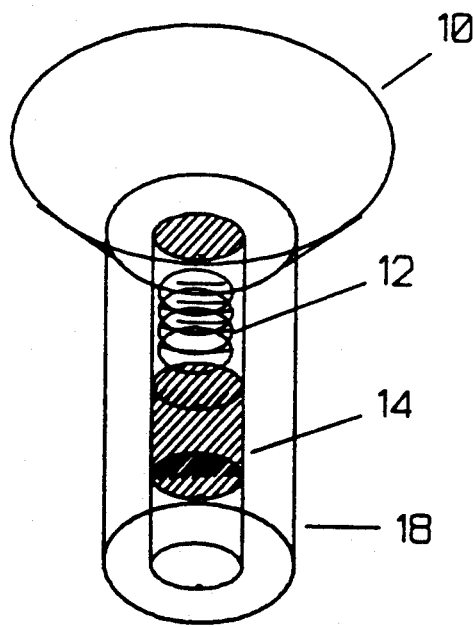
FIG. 3 is a perspective view of the stud in the retracted position.
Figure 4:
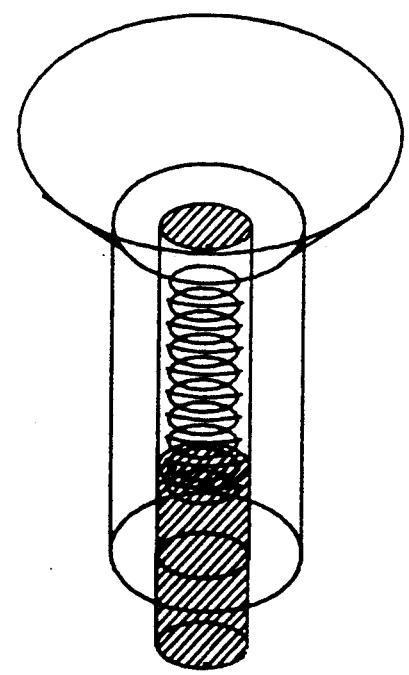
FIG. 4 is a perspective view of the stud in the extended position.
Figure 10:
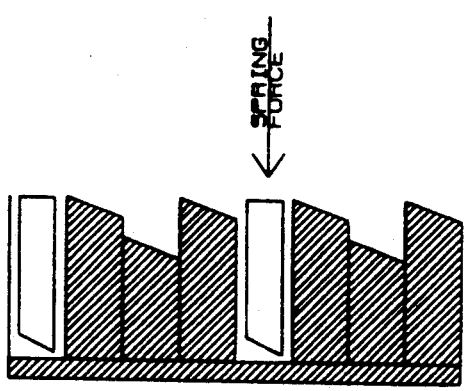
FIG. 10 is a flattened side view of half (180 degrees) the stud jacket grooves with (2 of the 4 stud pin projections engaged with the grooves. This corresponds to the extended pin position.)
Figure 13:
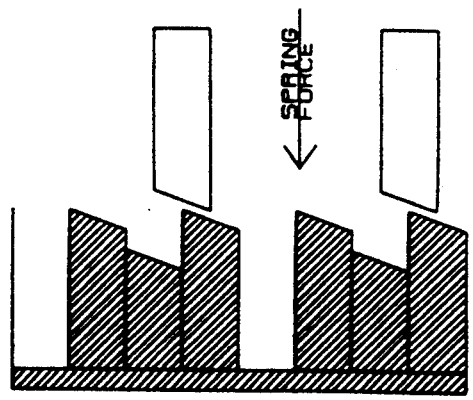
FIG. 13 is a continuation of FIG. 12. (The pin has been manually depressed again until the pin projections have cleared the jacket grooves. As in FIG. 11, the pin is rotating to the right.)

When an external force is applied to the pin the pin is pushed back and rotates to the right due tot the rightward slant of the pin projections, item 44, and jacket grooves, item 32, as illustrated in FIG. 15. When the pin has been pushed far enough that the pin projections clear the shallow jacket groove notch as in FIG. 13, the pin projections rotate further to the right and are propelled into the deeper jacket groove notches, item 24, by the compressed spring when the external force is removed, as shown in FIG. 13. The pin is now in the rotatably fixed extended position. The rotatably fixed extended position of the pin, FIG. 2, is accomplished by the interaction between the pin projections, item 44, and the jacket grooves, item 32, as shown in FIG. 10. This interaction between the pin projections and the jacket grooves illustrated by FIG. 10 likewise prevents the pin from being propelled all the way out of the stud jacket by the spring, item 12.

Figure 5:
FIG. 5 is a side view of the stud and tire surface with the pin extended further than the optimal distance. (The pin has not yet come into contact with the roadway surface.)
Figure 6:
FIG. 6 is a continuation of FIG. 5 in time. (The tire has now rolled to the point where the pin is in contact with the roadway and compressed the spring so that the pin is now at the optimum extension.)
Figure 7:
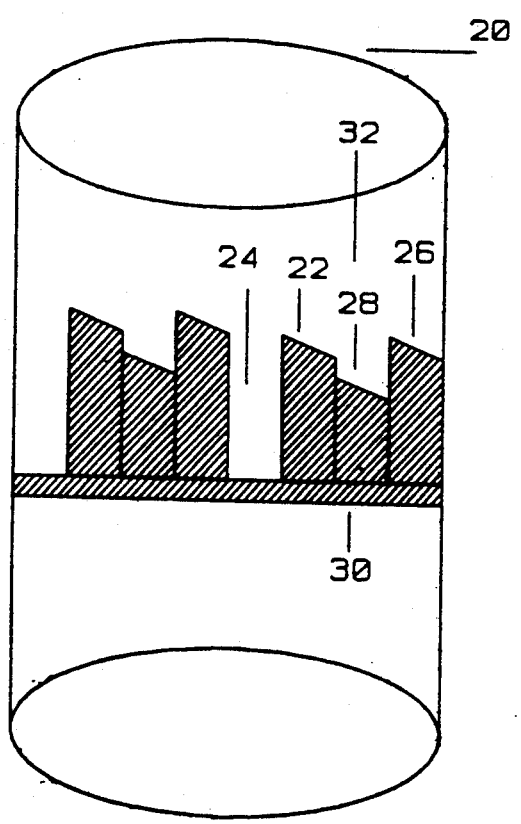
FIG. 7 is a cutaway view of half of the stud jacket interior showing part of the pin locking and release mechanism. That part being half of the grooves located on the inner stud jacket wall.
Figure 8:
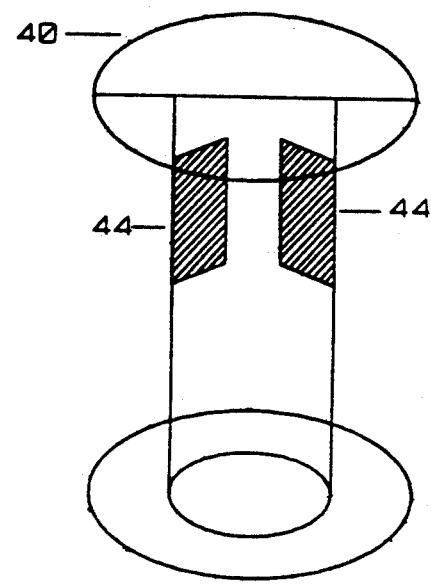
FIG. 8 is a perspective view of the stud pin showing part of the pin locking and release mechanism. (That part being 2 of the 4 the projections located on the pin which fit into the grooves shown in FIG. 7.)
Figure 9:
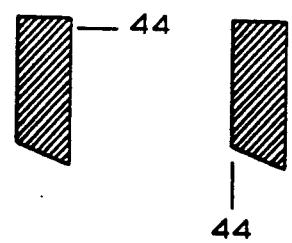
FIG. 9 is a side view of 2 of the 4 projections located on the pin (which fit into the grooves shown in FIG. 7.)

When the pin is not in contact with the roadway, as in FIG. 5, the pin is projected the maximum distance from the tire surface, item 16, that the interaction of the pin projection and jacket grooves, FIG. 10, will allow. As the pin comes into contact with the roadway, FIG. 6, the pin is pushed into the stud jacket until the force exerted by the roadway upon the pin equals the force exerted on the pin from the compressed spring. The spring is designed in such a fashion that when these two forces are equal the pin will be at the optimal extension distance from the tire surface. (i.e. that distance that maximizes the anti-slippage features of the stud.)

Figure 11:
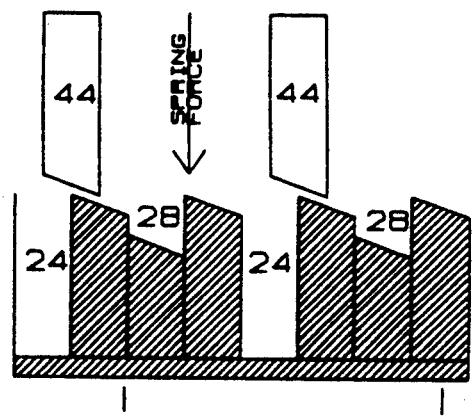
FIG. 11 is a continuation of FIG. 10. (The pin has been manually depressed so that the projections on the side of the pin have cleared the jacket grooves and the pin is now rotating to the right. For an illustration of mechanism causing pin to rotate to the right see FIG. 15.)

The pin can be moved form the rotatably fixed extended position to the locked retracted position by application of an external force upon the pin sufficient to push the pin into the stud jacket, against the force of the compressed spring, far enough, FIG. 2, that the pin projections, item 44, can rotate to the right out of the deep jacket grooves, item 24, and into the shallow jacket grooves, item 28, as shown in FIG. 11. The locked retracted position of the pin, FIG. 1, is accomplished by interaction between the pin projections, item 44, and jacket grooves, item 32, as shown in FIG. 12.

The pin may be alternatively moved into the locked retracted, FIG. 1, and the rotatably fixed extended position, FIG. 2, by intermittent application of a sufficient external force upon the pin.

I claim:

1. A retractable tire stud comprising:
   (a) a sleeve in conjunction with a hardened pin inserted into a preformed opening in a tire,
   (b) said pin protruding from said sleeve and said tire surface when stud is in operation,
   (c) said pin being held at optimum protrusion by means of an extension mechanism,
   (d) said pin being retractable into said sleeve by means of an external force pressing said pin into said sleeve,
   (e) said pin locking into a retracted position by means of an internal locking mechanism,
   (f) said locking mechanism releasing said pin from said retracted position by means of said external force pressing said pin further into said sleeve than said locking position.

2. The tire stud of claim 1, wherein said locking mechanism comprises a series of projections located upon said pin in interaction with a series of grooves located upon said sleeve.

3. The tire stud of claim 1, wherein said extension mechanism is a helical spring.

* * * * *